United States Patent
Sato et al.

(10) Patent No.: US 11,926,036 B2
(45) Date of Patent: Mar. 12, 2024

(54) INFORMATION PROCESSING DEVICE AND SCHEDULING METHOD

(71) Applicant: SONY CORPORATION, Tokyo (JP)

(72) Inventors: Yoshiaki Sato, Tokyo (JP); Kazuo Hongo, Tokyo (JP)

(73) Assignee: SONY CORPORATION, Tokyo (JP)

( * ) Notice: Subject to any disclaimer, the term of this patent is extended or adjusted under 35 U.S.C. 154(b) by 303 days.

(21) Appl. No.: 17/278,879

(22) PCT Filed: Sep. 26, 2019

(86) PCT No.: PCT/JP2019/037854
§ 371 (c)(1),
(2) Date: Mar. 23, 2021

(87) PCT Pub. No.: WO2020/071236
PCT Pub. Date: Apr. 9, 2020

(65) Prior Publication Data
US 2022/0048196 A1    Feb. 17, 2022

(30) Foreign Application Priority Data

Oct. 3, 2018 (JP) .................................. 2018-188559

(51) Int. Cl.
*G05B 15/02* (2006.01)
*A47J 36/32* (2006.01)
*A47J 44/00* (2006.01)
*B25J 11/00* (2006.01)

(52) U.S. Cl.
CPC ........... *B25J 11/0045* (2013.01); *A47J 36/32* (2013.01); *A47J 44/00* (2013.01); *G05B 15/02* (2013.01)

(58) Field of Classification Search
CPC ........ A47J 36/32; A47J 44/00; B25J 11/0045; B25J 19/0058; G05B 15/02
See application file for complete search history.

(56) References Cited

U.S. PATENT DOCUMENTS

2013/0101714 A1* 4/2013 Buehler ............... A23L 5/10
99/341

FOREIGN PATENT DOCUMENTS

| CN | 1617058 A | 5/2005 |
|---|---|---|
| CN | 102298608 A | 12/2011 |
| CN | 104871602 A | 8/2015 |
| CN | 106844877 A | 6/2017 |
| CN | 108259534 A | 7/2018 |
| JP | 2005-504259 A | 2/2005 |

(Continued)

OTHER PUBLICATIONS

International Search Report and Written Opinion of PCT Application No. PCT/JP2019/037854, dated Dec. 10, 2019, 09 pages of ISRWO.

(Continued)

*Primary Examiner* — Yuhui R Pan
(74) *Attorney, Agent, or Firm* — CHIP LAW GROUP

(57) ABSTRACT

Execution restrictions on tasks based on a state of a multi-function robot or the like are satisfied, and furthermore, the execution efficiency of the entirety of an operation is also enhanced. An information processing device includes a determination unit that determines an execution order of a plurality of tasks including an operation for a target object, based on a transition of a state of an operation tool used in each of the tasks.

10 Claims, 12 Drawing Sheets

(56) References Cited

FOREIGN PATENT DOCUMENTS

| | | | |
|---|---|---|---|
| JP | 2005-250857 A | | 9/2005 |
| JP | 2006-072894 A | | 3/2006 |
| JP | 2006072894 A | * | 3/2006 |
| JP | 2009-297880 A | | 12/2009 |
| JP | 2011-108156 A | | 6/2011 |
| JP | 2015-201210 A | | 11/2015 |
| JP | 6568382 B2 | | 8/2019 |
| WO | WO-0151919 A2 | | 7/2001 |

OTHER PUBLICATIONS

Extended European Search Report of EP Application No. 19869210.5, dated Oct. 25, 2021, 11 pages.

* cited by examiner

FIG.7

| STATE BEFORE TRANSITION | OPERATION PROCESS | | | | | | |
|---|---|---|---|---|---|---|---|
| | COOKING PROCESS | | CONTACT PROCESS | | | | |
| | WASH-ING | HEAT-ING | 1w. WASH-ED | 2w. NOR-MAL | 3w. OBJECT ADHE-SION | 5w. BACTE-RIA ADHE-SION | 7w. HIGH-LEVEL CON-TAMINA-TION |
| 0f. UNWASHED | 2f | / | — | — | — | 4f | / |
| 2f. NORMAL | / | 6f | — | — | / | 5f | / |
| 4f. UNWASHED AND BACTERIA ADHESION | 5f | / | — | — | — | — | / |
| 5f. BACTERIA ADHESION | / | 6f | — | — | / | — | / |
| 6f. HEATED | / | — | — | — | / | / | / |

↑ STATE AFTER TRANSITION

FIG.8

| ITEM | PRESENT STATE |
|---|---|
| ROBOT ARM | 1w |
| KITCHEN KNIFE | 1w |
| FRYING PAN | 1w |
| CUTTING BOARD | 1w |
| PAN | 1w |
| TURNER | 1w |
| TABLESPOON (FOR FLOUR) | 1w |
| TABLESPOON (FOR CHINESE-STYLE SALAD DRESSING) | 1w |
| COLANDER | 1w |
| BOWL (FOR WASHING POTHERB MUSTARD IN COLD WATER) | 1w |

FIG.9

| RECIPE | ITEM | PRESENT STATE | COMPLETION STATE |
|---|---|---|---|
| HASH AND RICE | BUTTER | 2f | 6f |
| HASH AND RICE | END PIECES OF BEEF | 5f | 6f |
| HASH AND RICE | ONION | 0f | 6f |
| HASH AND RICE | MUSHROOM | 0f | 6f |
| HASH AND RICE | FLOUR | 2f | 6f |
| HASH AND RICE | RED WINE | 2f | 6f |
| HASH AND RICE | CANNED CUT-TOMATO | 2f | 6f |
| HASH AND RICE | CONSOMME | 2f | 6f |
| HASH AND RICE | WORCESTERSHIRE SAUCE | 2f | 6f |
| HASH AND RICE | SALT | 2f | 6f |
| HASH AND RICE | PEPPER | 2f | 6f |
| HASH AND RICE | SUGAR | 2f | 6f |
| CHINESE-STYLE SALAD | BEAN SPROUTS | 0f | 6f |
| CHINESE-STYLE SALAD | POTHERB MUSTARD | 0f | 2f |
| CHINESE-STYLE SALAD | CHINESE-STYLE SALAD DRESSING | 2f | 2f |

FIG.10

| INGREDIENT | QUANTITY |
|---|---|
| BUTTER | 10g |
| END PIECES OF BEEF | 250g |
| ONION | 1 PIECE |
| MUSHROOM | 1 CAN |
| FLOUR | 2 TABLESPOONS |
| RED WINE | 100ml |
| CANNED CUT-TOMATO | 400g |
| CONSOMME | 1 CUP |
| WORCESTERSHIRE SAUCE | 2 TABLESPOONS |
| SALT | SUITABLE AMOUNT |
| PEPPER | SUITABLE AMOUNT |
| SUGAR | SUITABLE AMOUNT |

FIG.11

```
RECIPE FOR HASH AND RICE

A) HEAT BUTTER WITH FRYING PAN TO MELT.
B) WASH ONION IN COLD WATER, AND PEEL AND SLICE IT.
C) ADD BEEF, ONION, AND MUSHROOM TO FRYING PAN TO STIR-FRY.
D) ADD FLOUR WHILE EVENLY SPRINKLING, AND STIR WELL.
E) ADD RED WINE, CANNED CUT-TOMATO, WORCESTERSHIRE SAUCE, AND
   CONSOMME.
   WHEN COMING TO BOIL, THEN REDUCE HEAT AND SIMMER FOR
   APPROXIMATELY 15 MINUTES.
F) ADD SALT, PEPPER, AND SUGAR TO TASTE.
```

FIG.12

| INGREDIENT | QUANTITY |
|---|---|
| BEAN SPROUTS | 120g |
| POTHERB MUSTARD | 1 BUNDLE |
| CHINESE-STYLE SALAD DRESSING | 2 TABLESPOONS |

FIG.13

```
RECIPE FOR CHINESE-STYLE SALAD

G) WASH BEAN SPROUTS IN COLD WATER, BOIL THEM FOR 30 SECONDS
   WITH BOILING WATER, AND TAKE THEM OUT OF BOILING WATER WITH
   COLANDER TO LET THEM COOL SLIGHTLY.
H) WASH POTHERB MUSTARD IN COLD WATER, DRAIN WATER OFF IT,
   AND CUT IT INTO PIECES IN LENGTHS OF 4 cm.
I) DISH OUT G AND H, AND PUT CHINESE-STYLE SALAD DRESSING
   THEREON.
```

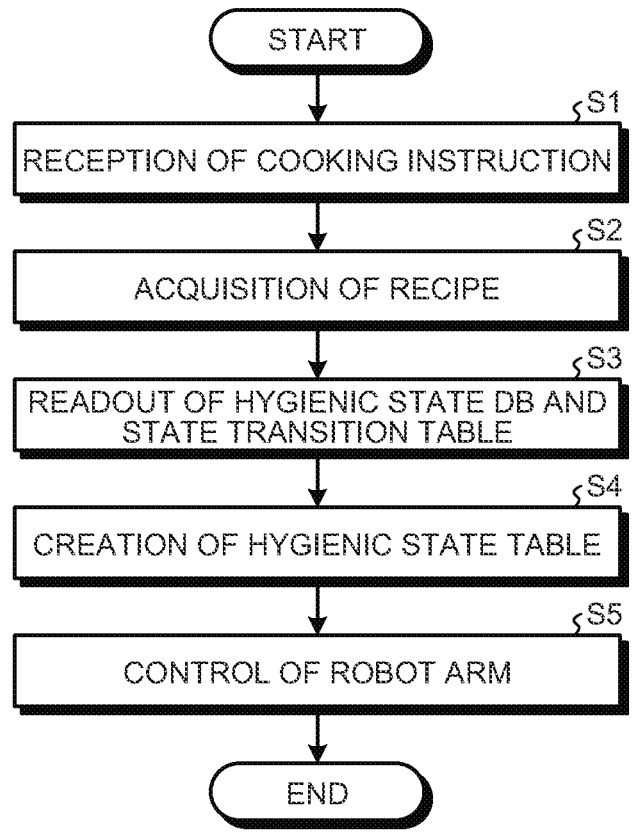

INFORMATION PROCESSING DEVICE AND SCHEDULING METHOD

CROSS REFERENCE TO RELATED APPLICATIONS

This application is a U.S. National Phase of International Patent Application No. PCT/JP2019/037854 filed on Sep. 26, 2019, which claims priority benefit of Japanese Patent Application No. JP 2018-188559 filed in the Japan Patent Office on Oct. 3, 2018. Each of the above-referenced applications is hereby incorporated herein by reference in its entirety.

FIELD

The present invention relates to an information processing device, a scheduling method, and a computer program.

BACKGROUND

In recent years, robots have realized various types of automation in a culinary field, for example, but, under the present circumstances, generally, a machine specifically designed for a limited task performs the task repeatedly. For example, in the culinary field, there are machines specifically designed for potato peeling, chicken processing, or sushi rice making.

On the occasion of introducing a robot in the future, from the viewpoint of cost, it is expected to introduce not a plurality of special-purpose machines, but a single multifunction robot. However, a multifunction robot sometimes has restrictions when, after the execution of a certain task, the robot performs a subsequent task.

For example, in the case of a robot configured to perform a cooking task, when a robot arm cuts chicken for the purpose of preparing deep-fried chicken and then tears the leaves off lettuce to be served with chicken, pathogens such as *campylobacter* and *salmonella* hiding in raw chicken, adhere to the lettuce, and cause food poisoning. Furthermore, a parasitic worm called a *toxoplasma* hides in soil mixed with raw meat or cat droppings, and when this parasitic worm infects a pregnant woman, an impairment in an embryonic brain or embryonic eyes sometimes occurs. Therefore, when, after the completion of a certain cooking task, a subsequent cooking task is performed, there are restrictions that, for example, a robot arm needs to be washed, or plastic gloves needs to be replaced.

Note that, as a technology related to cooking, there is the technology of reproducing a cook's cooking technique, which is realized in such a manner that a motion track of a pan or a turner being used by a cook is sensed by image processing and furthermore the temperature and heating power of the pan, the amount of main cooking ingredients and seasoning used, and the start time and duration of cooking are recorded.

Furthermore, for human-robot cooperative work, there is the technology of comparing the present position of an object with an order of operations assigned to a person and a robot, respectively, and the procedure of recording the handled object in each operation, and, when the person places the object, calculating an excessive time caused by the placement of the object. This technology makes it possible to prevent time from being uselessly spent due to the placement of the object.

CITATION LIST

Patent Literature

Patent Literature 1: Japanese Translation of PCT Application Laid-open No. 2005-504259
Patent Literature 2: Japanese Patent Application Laid-open No. 2009-297880

SUMMARY

Technical Problem

When, after the execution of a certain task, a multifunction robot follows restrictions imposed on the execution of a subsequent task, the execution efficiency of the entirety of an operation is reduced. For example, when washing of a robot arm and replacement of plastic gloves are performed after each cooking task, it takes time to do the cooking, whereby the efficiency of cooking is decreased.

Therefore, the present disclosure provides an information processing device, a scheduling method, and a computer program that are capable of satisfying execution restrictions imposed on a task, based on the state of a multifunction robot or the like, and enhancing the execution efficiency of the entirety of an operation.

Solution to Problem

To solve the above-described problem, an information processing device according to one aspect of the present disclosure, comprises a determination unit configured to determine an execution order of a plurality of tasks including an operation for a target object, based on a transition of a state of an operation tool used in each of the tasks.

(Effects) The information processing device of one aspect according to the present disclosure determines an execution order of a plurality of tasks including an operation for a target object, based on a transition of the state of an operation tool. Thus, the order of the tasks can be determined so as not to cause an inappropriate state transition, and execution restrictions on the tasks can be satisfied. As a result, not only the satisfaction of execution restrictions on a task of a multifunction robot, but also shortening operation hours for the task of the multifunction robot can be achieved.

BRIEF DESCRIPTION OF DRAWINGS

FIG. 7 is a diagram illustrating an example of a state transition table of food that requires to be heated.

FIG. 8 is a diagram illustrating an example of a hygienic state table indicating the present hygienic states of the robot arm and the kitchenware.

FIG. 9 is a diagram illustrating an example of a hygienic state table indicating the present hygienic states of food.

FIG. 10 is a diagram illustrating an example of ingredients of hash and rice.

FIG. 11 is a diagram illustrating an example of a recipe for hash and rice.

FIG. 12 is a diagram illustrating an example of ingredients of a Chinese-style salad.

FIG. 13 is a diagram illustrating an example of a recipe for the Chinese-style salad.

FIG. 15 is a flowchart that illustrates the flow of a cooking control action according to an embodiment of the present disclosure.

DESCRIPTION OF EMBODIMENTS

Hereinafter, embodiments of the present disclosure will be described in detail, based on the drawings. Note that, in the following embodiments, the same constituents are assigned with the same reference sign, so that any redundant description will be omitted.

The present disclosure will be described in the order of items below.

1. Embodiment
    1.1 Configuration of Cooking Robot
    1.2 Functional Configuration of Cooking Control Unit
    1.3 Hygienic State Transition
    1.4 Hygienic State Management
    1.5 Management in Accordance with Operation Task
    1.6 Cooking Control Action
    1.7 Effects

1. Embodiment

Hereinafter, an information processing device, a scheduling method, and a computer program according to an embodiment of the present disclosure will be described in detail with reference to the drawings. In the present embodiment, a schedule that allows a multifunctional robot to hygienically and efficiently cook is drawn up by managing transitions of hygienic states of a robot arm, kitchenware, and food.

1.1 Configuration of Cooking Robot

Figure 1:
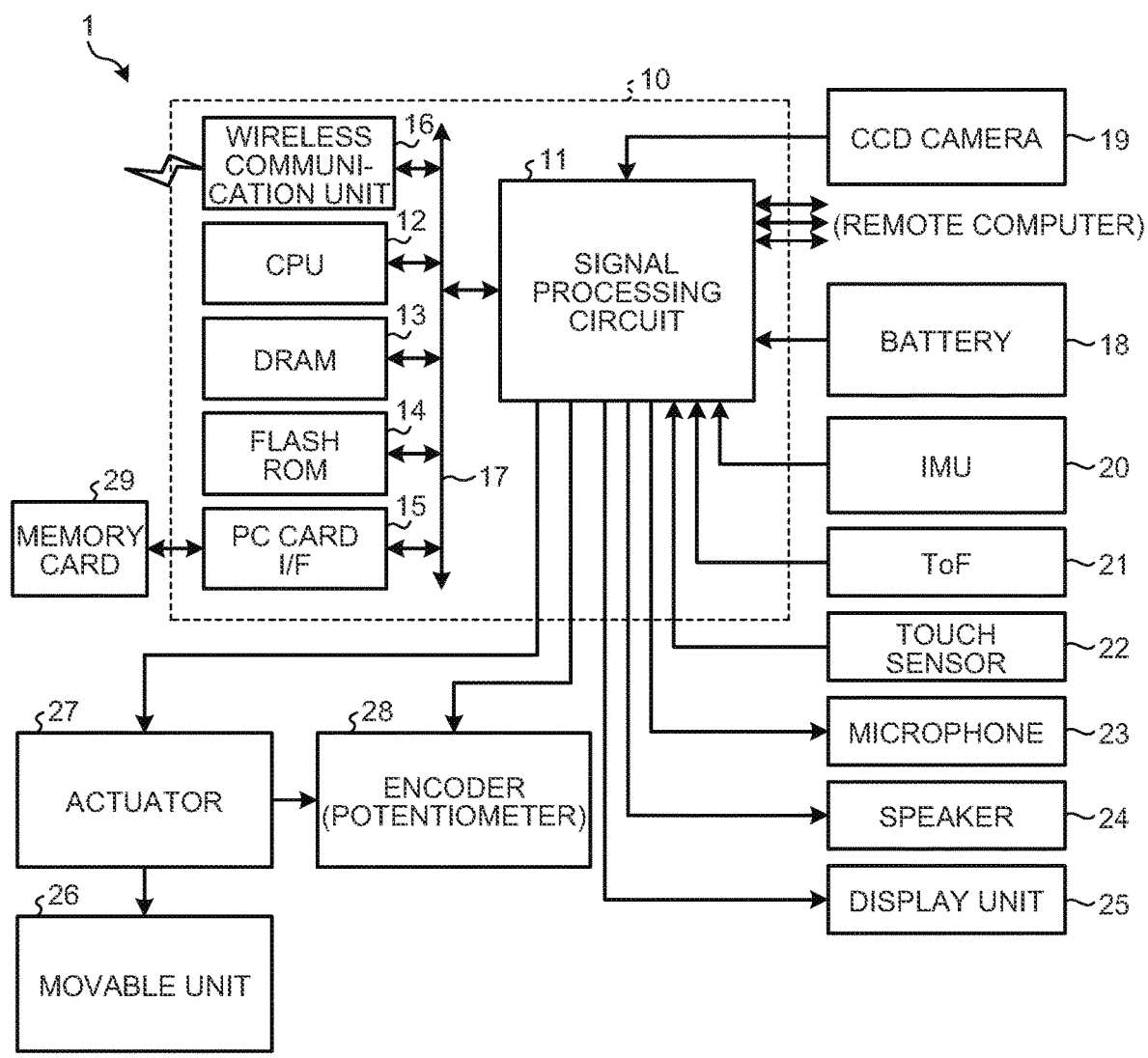
FIG. 1 is a block diagram illustrating an example of a schematic configuration of a cooking robot according to an embodiment of the present disclosure.

FIG. 1 is a block diagram illustrating an example of a schematic configuration of a cooking robot according to the present embodiment. As illustrated in FIG. 1, a cooking robot 1 includes, for example, a controller 10, and a battery 18 serving as a power source of the cooking robot 1. The controller 10 is formed by mutually connecting a central processing unit (CPU) 12, a dynamic random access memory (DRAM) 13, a flash read only memory (ROM) 14, a personal computer (PC) card interface (I/F) 15, a wireless communication unit 16, and a signal processing circuit 11 via an internal bus 17.

The cooking robot 1 further includes, as an operation mechanism for realizing a cooking operation, a movable unit 26 such as a joint of an arm, and an actuator 27 for driving the movable unit 26.

As sensors (hereinafter, referred to as inner sensors) for acquiring information, such as a moved distance, the cooking robot 1 further includes: a movement speed, and a movement direction: an inertial measurement unit (IMU) 20 configured to sense the orientation of the robot itself and the acceleration of a motion; and an encoder (or a potentiometer) 28 configured to sense the driving amount of an actuator 27. Note that, besides the above-mentioned sensors, for example, an accelerometer and an angular velocity sensor may be used as inner sensors.

As sensors (hereinafter, referred to as external sensors) for acquiring information, such as geographical features around the robot itself and the distance to and direction of an object present around the robot itself, the cooking robot 1 further includes: a charge coupled device (CCD) camera 19 configured to capture an image of an external situation; and a time-of-flight (ToF) sensor 21 configured to measure the distance between the robot itself and an object present in a specific direction from the robot itself. Note that, besides the above-mentioned sensors, for example, a light detection and ranging or laser imaging detection and ranging (LIDAR) sensor, a global positioning system (GPS) sensor, a magnetometric sensor, and a unit for measuring a radio field intensity (hereinafter, referred to as a radio field intensity sensor) in the wireless communication unit 16, such as Bluetooth (registered trademark) or Wi-Fi (registered trademark) may be used as external sensors.

Furthermore, the cooking robot 1 may be provided with a touch sensor 22 configured to sense a physical pressure applied from the outside, a microphone 23 configured to collect external sound, a speaker 24 configured to output a sound or the like to the circumference, and a display unit 25 configured to display various information for a user or the like.

In the above-described configuration, the sensors, such as the IMU 20, the touch sensor 22, the ToF sensor 21, the microphone 23, the speaker 24, and the encoder (or potentiometer) 28, and the display unit, the actuator 27, the CCD camera (hereinafter, simply referred to as a camera) 19, and the battery 18 are each connected to the signal processing circuit 11 of the controller 10.

The signal processing circuit 10 is configured to sequentially fetch sensor data, image data, and voice data that are supplied from the above-mentioned sensors, and sequentially store these pieces of data in a specified area in the DRAM 13 via the internal bus 17, respectively. Furthermore, besides the above-mentioned data, the signal processing circuit 11 is configured to sequentially fetch, remaining battery power data indicating the remaining amount of battery power supplied from the battery 18, and store the data in the specified area in the DRAM 13.

The various sensor data, the image data, the voice data, and the remaining battery power data, each thus having been stored in the DRAM 13, are used when the CPU 12 performs the action control of the cooking robot 1, and are also transmitted to an external server or the like via the wireless communication unit 16, if needed. Note that the wireless communication unit 16 may be a communication unit configured to communicate with an external server or the like via a predetermined network, such as a wireless local area network (LAN) and a mobile communications network, besides Bluetooth (registered trademark) and Wi-Fi (registered trademark).

For example, at an initial stage at which the power of the cooking robot 1 is turned on, the CPU 12 is configured to read out, via the PC card interface 15 or directly, a control program stored in a memory card 29 loaded into a not-illustrated PC card slot or in the flash ROM 14, and store the control program in the DRAM 13.

Furthermore, the CPU 12 is configured to determine a situation of the robot itself and a situation around the robot and the presence or absence of an instruction and an approach from a user, based on the various sensor data, the image data, the voice data, and the remaining battery power data sequentially stored in the DRAM 13 by the signal processing circuit 11 as described above.

The CPU 12 is configured to then determine a subsequent action, based on the above-mentioned determination results and the cooking control program stored in the DRAM 13, and also drive a necessary actuator 27, based on the determination results, to execute a cooking operation.

The CPU 12 is configured to compile voice data at that time, if needed, and supply the voice data in the form of a sound signal to the speaker 24 via the signal processing circuit 11, thereby outputting a sound based on the sound signal or displaying various information on the display unit 25.

Thus, the cooking robot 1 is configured to autonomously cook, based on a situation of the robot itself and a situation around the robot and an instruction and an approach from a user.

Note that the above-described configuration of the cooking robot 1 is merely one example, and various configurations of the cooking robot 1 can be applied in accordance with a purpose or a use.

1.2 Functional Configuration of Cooking Control Unit

Figure 2:
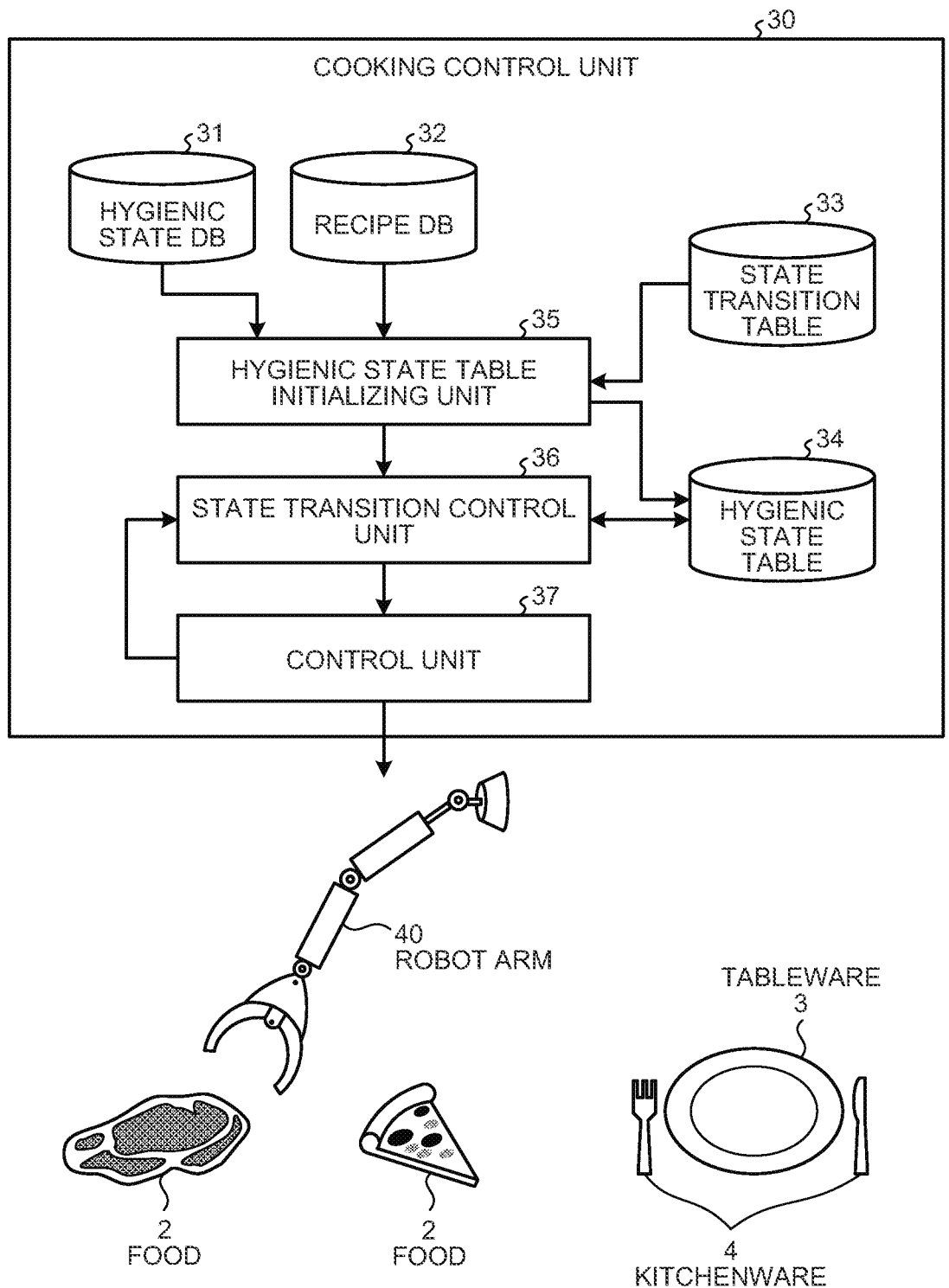
FIG. 2 is a diagram illustrating a functional configuration of a cooking control unit according to an embodiment of the present disclosure.

Next, a functional configuration of a cooking control unit will be described. The cooking control unit is realized by executing a cooking control program by the CPU 12. FIG. 2 is a diagram illustrating the functional configuration of the cooking control unit. As illustrated in FIG. 2, a cooking control unit 30 includes a hygienic state database (DB) 31, a recipe DB 32, a state transition table 33, a hygienic state table 34, a hygienic state table initializing unit 35, a state transition control unit 36, and a control unit 37.

The hygienic state DB 31 is configured to memorize initial hygienic states of a robot arm 40 and kitchenware 4. The initial hygienic state is usually a clean state in which washing has been completed. In the case where the kitchenware 4 and the robot arm 40 can be regarded as being always in a normal state, the cooking control unit 30 may not include the hygienic state DB 31.

The recipe DB 32 is a database (DB) in which recipe information is stored. In the case where the cooking control unit 30 is configured to fetch recipe information from an external website or the like, the cooking control unit 30 may not include the recipe DB 32.

The state transition table 33 is a table that defines state transitions of hygienic states of the robot arm 40, the kitchenware 4, and food 2.

The hygienic state table 34 includes a table for managing hygienic states of the food 2 indicated in a recipe, the kitchenware 4 to be used for cooking in accordance with the recipe, and the robot arm 40. The hygienic state table 34 further includes a table that indicates correspondences between the hygienic states and cooking operation tasks of the food 2, the kitchenware 4, and the robot arm 40.

The hygienic state table initializing unit 35 is configured to draw up the hygienic state table 34 based on the hygienic state DB 31, the recipe DB 32, and the state transition table 33 to initialize the hygienic state table 34.

The state transition control unit 36 is configured to transmit an instruction about an operation task indicated in the hygienic state table 34 to the control unit 37.

The control unit 37 is configured to perform a cooking operation by controlling the robot arm 40, based on the instruction about the operation task received from the state transition control unit 36. When completing one operation task, the control unit 37 informs the state transition control unit 36 of the completion of the task. After the completion of the task has been informed, the control unit 37 transmits an instruction about a subsequent operation task indicated in the hygienic state table 34 to the state transition control unit 36.

1.3 Hygienic State Transition

Figure 3:
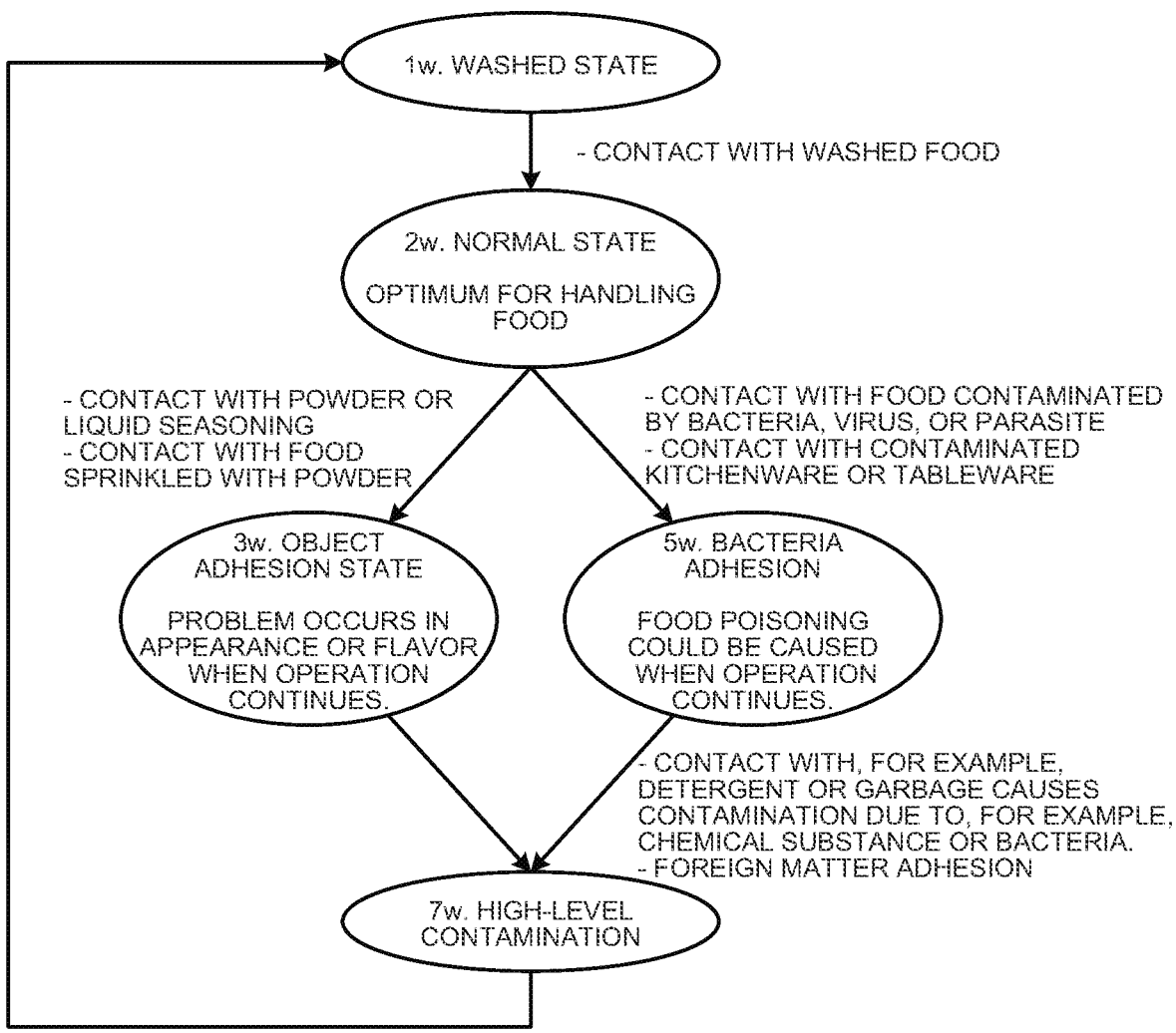
FIG. 3 is a diagram illustrating state transitions for the hygiene management of a robot arm and kitchenware.

Next, state transitions for the hygiene management of the robot arm 40, the kitchenware 4, and the food 2 will be described. FIG. 3 is a diagram illustrating state transitions for the hygiene management of the robot arm 40 and the kitchenware 4. As illustrated in FIG. 3, the hygienic state of the robot arm 40 and the kitchenware 4 includes a state $1w$, a state $2w$, a state $3w$, a state $5w$, and a state $7w$. Here, "w" stands for kitchenware.

The state $1w$ is a washed state in which washing has been already done using a detergent or the like. The state $2w$ is a normal state suitable for treating food 2 and indicating no adhesion of harmful bacteria or viruses. This state is a state that allows the handling of unheated food 2. This state is not suitable for long-term storage of the robot arm 40, but allows short-time handling of the food 2. Contact with the washed food 2 under the state $1w$ causes the hygienic state to transition to the state $2w$.

The state $3w$ is an object adhesion state in which there is no contamination by harmful bacteria or viruses, but there is adhesion of seasonings, such as sugar, salt, and soy sauce, and powder such as flour, liquid such as fruit juice, and dust in small amount. Under the state $2w$, for example, contact with powder or liquid seasonings or contact with the food 2 with sprinkled powder causes the hygienic state to transition to the state $3w$. The above-mentioned state is brought about when the robot arm 40 touches a doughnut and then touches a peeled apple, for example.

The state $5w$ is a bacteria adhesion state, specifically a state of contamination by harmful viruses or bacteria. Under the state $2w$, for example, contact with the food 2 contaminated by bacteria, viruses, or parasites or contact with contaminated kitchenware 4 or tableware 3 causes the hygienic state to transition to the state $5w$. Contact with raw chicken causes this state.

The state $7w$ is a high-level-contamination state that is unsuitable for handling food 2. The state $7w$ is a state of adhesion of chemical substances such as a detergent, contact with dirty things such as kitchen garbage, and adhesion of sand and mud. Under the state $3w$ or the state $5w$, for example, contamination by a chemical substance, bacteria, or the like caused by contact with detergent, garbage, or the like, or adhesion of a foreign matter causes the hygienic state to transition to the state $7w$. After the robot arm 40 puts away kitchen garbage, handles a detergent, or washes vegetables with mud cultivated in a kitchen garden, the robot is in this state. In the states $3w$ and $5w$, contamination can be removed by heating, but, in the state $7w$, contamination cannot be removed by heating.

Note that FIG. 3 illustrates some state transitions, whereas some state transitions are not illustrated in FIG. 3. For example, there is a transition from the washed state (the state $1w$) to the bacteria adhesion state (the state $5w$), to the object adhesion state (the state $3w$), or to the high-level-contamination state (the state $7w$).

Figure 4:
FIG. 4 is a diagram illustrating an example of a state transition table of the robot arm and the kitchenware.

FIG. 4 is a diagram illustrating an example of the state transition table 33 of the robot arm 40 and the kitchenware 4. In FIG. 4, the vertical axis indicates a state before a state transition, and the horizontal axis indicates an operation process. The operation process includes "maintenance", "cooking", "washing of food", "contact with food", and "contact with robot arm and kitchenware". The process "contact with robot arm and kitchenware" indicates contact with the kitchenware 4 in the case where the robot arm 40 is targeted, and indicates contact with the robot arm 40 in the case where the kitchenware 4 is targeted. In the middle section of the table, states after a state transition are indicated. The mark "−" in the table indicates that a state does not transition and thereby does not change. The mark "/" indicates forbidding the operation process. Examples of the kitchenware include a kitchen knife and a cutting board.

For example, the kitchenware 4 in the washed state (the state 1w) is forbidden from being washed or replaced. Even when the kitchenware 4 in the washed state (the state 1w) is heated, the hygienic state of the kitchenware 4 remains in the washed state. When the food 2 in an unwashed state is washed using the kitchenware 4 in the washed state (the state 1w), the hygienic state of the kitchenware 4 transitions to the normal state (the state 2w). When the kitchenware 4 in the washed state (the state 1w) comes into contact with the robot arm 40 in the object adhesion state (the state 3w), the hygienic state of the kitchenware 4 transitions to the object adhesion state (state 3w).

Also when a plurality of the robot arms 40 cooperates with each other, the hygienic state is managed using the same table. The hygienic states of the robot arm 40 and the kitchenware 4 are equally managed by this state transition table 33.

Figure 5:
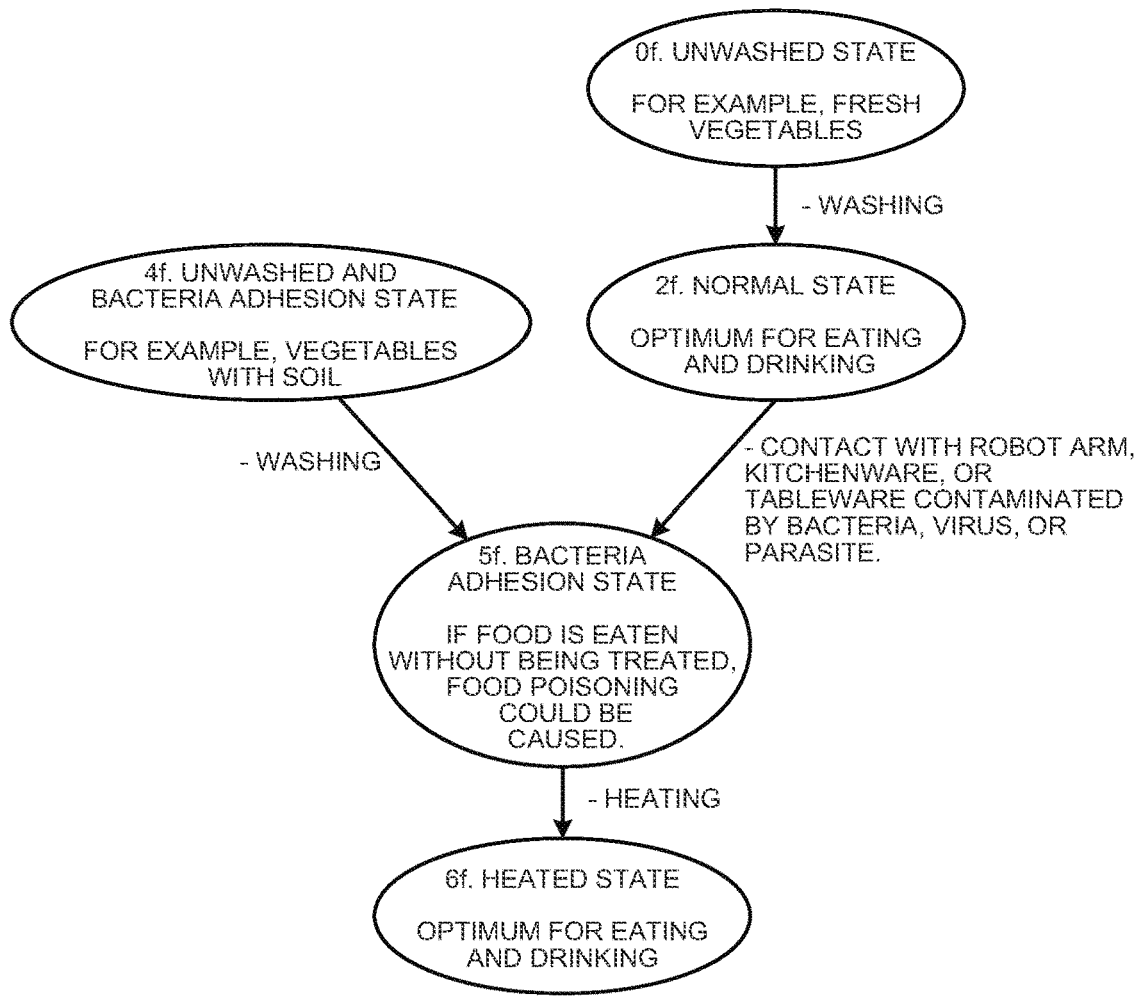
FIG. 5 is a diagram illustrating state transitions for the hygiene management of food.

FIG. 5 is a diagram illustrating a state transition for the hygiene management of food 2. As illustrated in FIG. 5, the hygienic state of the food 2 includes a state 0f, a state 2f, a state 4f, a state 5f, and a state 6f. Here, the letter "f" stands for food.

The state 0f is an unwashed state indicating a state of, for example, fresh vegetables purchased at a shop. Through washing such as slight washing in water, the state 0f can be shifted to the state 2f suitable for eating and drinking.

The state 2f is a normal state that allows a user to eat food as it is. For example, the state of cheese or slices of raw fish falls under the state 2f. Under the state 2f, for example, contact with the kitchenware 4 or the tableware 3 contaminated by bacteria, viruses, or parasites causes the hygienic state to transition to the state 5f.

The state 4f is an unwashed and bacteria adhesion state in which food is unwashed and bacteria adhere thereto. For example, the state of a vegetable with soil, the vegetable being not purchased at a supermarket but cultivated in a kitchen garden, falls under the state 4f. For example, through washing, the food 2 in the state 4f transitions to the state 5f.

The state 5f is a bacteria adhesion state in which bacteria and parasites adhere to the food. For example, the state of raw chicken falls under the state 5f. When the food 2 in the state 5f is served for eating and drinking as it is, it may cause food poisoning.

The state 6f is a heated state. For example, the state of chicken having been subjected to heating falls under the state 6f. For example, heating under the state 5f causes the hygienic state to transition to the state 6f.

Note that FIG. 5 illustrates merely some state transitions, whereas some state transitions are not illustrated in FIG. 5. For example, there is a transition from the unwashed state (the state 0f) to the unwashed and bacteria adhesion state (the state 5f).

Figure 6:
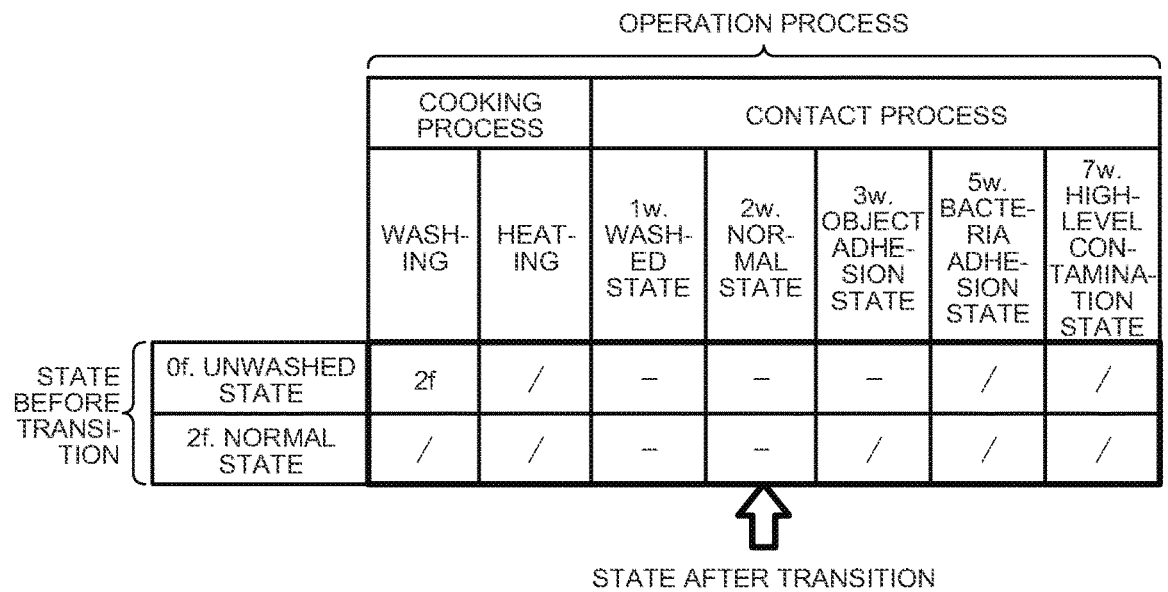
FIG. 6 is a diagram illustrating an example of a state transition table of food that does not require to be heated.

FIG. 6 is a diagram illustrating an example of the state transition table 33 of food 2 that does not require to be heated. As illustrated in FIG. 6, the initial state of the food 2 that does not require to be heated falls under the state 0f or the state 2f. The final state after cooking of the food 2 that does not require to be heated falls under the state 2f. The operation process for the food 2 that does not require to be heated includes "a cooking process" and "a contact process". For example, slices of raw fish and fresh vegetables are categorized into the food 2 that does not require to be heated. The food 2 in the unwashed state is forbidden from being heated, and forbidden from coming into contact with the kitchenware 4 or the robot arm 40 in the bacteria adhesion state or the high-level contamination state.

FIG. 7 is a diagram illustrating an example of the state transition table 33 of food 2 that requires to be heated. As illustrated in FIG. 7, the final state of the food 2 that requires to be heated is the state 6f. The operation process for the food 2 that requires to be heated includes "a cooking process" and "a contact process". Examples of the food 2 that requires to be heated include pork, sliced salmon, and burdock. An initial state of the food 2 that requires to be heated is the state 0f, the state 2f, the state 4f, or the state 5f.

1.4 Hygienic State Management

Next, hygienic state management for the robot arm 40, the kitchenware 4, and food 2 will be described. The hygienic states of the robot arm 40, the kitchenware 4, and the food 2 are managed using the hygienic state table 34. FIG. 8 is a diagram illustrating an example of the hygienic state table 34 indicating the present hygienic states of the robot arm 40 and the kitchenware 4. As illustrated in FIG. 8, this hygienic state table 34 establishes a correspondence between an item name and the present states of the item. The item name is "robot arm" or the name of the kitchenware 4. The present state is the present hygienic state of the robot arm 40 or the kitchenware 4.

Regarding the hygienic states of the robot arm 40 and the kitchenware 4, when cooking is started, the hygienic state table initializing unit 35 reads out a hygienic state at the time of the previous cooking end from the hygienic state DB 31. Usually, washing of the robot arm 40 and the kitchenware 4 is completed so that the robot arm 40 and the kitchenware 4 are clean. The read-out hygienic state is recorded in the hygienic state table 34.

FIG. 9 is a diagram illustrating an example of the hygienic state table 34 indicating the present hygienic state of food 2. In FIG. 9, there is illustrated a case in which a table is drawn up based on ingredients of hash and rice listed in FIG. 10, a recipe for the hash and rice illustrated in FIG. 11, ingredients of a Chinese-style salad listed in FIG. 12, and a recipe for the Chinese-style salad illustrated in FIG. 13.

As illustrated in FIG. 9, this hygienic state table 34 establishes a correspondence among a recipe, an item name, the present state of the item, and a completion state for each food. The recipe means a recipe in which the food 2 is used. The item name means the name of the food 2. The present state means the present hygienic state of the food 2. The completion state means a hygienic state of the food 2 at the time of the completion of cooking.

The hygienic state table initializing unit 35 is configured to acquire a recipe from the recipe DB 32. Alternatively, the hygienic state table initializing unit 35 may be configured to acquire a recipe by receiving manual input or acquire a recipe from the outside via a network.

Values in the hygienic state table 34 that indicate the present hygienic states of the robot arm 40, the kitchenware 4, and the food 2 change whenever an operation task is executed. Basically, these values in the hygienic state table 34 change so that the number indicating a state becomes larger.

1.5 Management in Accordance with Operation Task

Next, hygiene management and time management in accordance with an operation task will be described. As illustrated in FIG. 9, in the case of hash and rice, all the ingredients become in the heated state, namely the state 6*f*, and therefore, passing through the bacteria adhesion state, namely the state 5*f*, during cooking will not be a hygienic problem.

On the other hand, a potherb mustard of the Chinese-style salad is food not to be heated, in other words, the final state of the potherb mustard is a normal state, namely, the state 2*f*, and therefore, the potherb mustard must not be in the bacteria adhesion state, namely the state 5*f*, at any time during cooking. Specifically, if the robot arm 40 having touched beef touches the potherb mustard without being treated, bacteria adhere to the potherb mustard, which is a hygienic problem. The cooking control unit 30 controls the hygienic state transition of the food 2 so as not to cause such a hygienic state transition. For example, the robot arm 40 in the state 5*w* after touching end pieces of beef is forbidden from coming into contact with the potherb mustard in accordance with FIG. 6. Thus, bacteria originated from beef do not adhere to the potherb mustard, and thus hygiene is maintained.

In order for the robot arm 40 to manage cooking in a short time, the robot arm 40 needs to prepare a plurality of dishes concurrently. According to the recipes illustrated in FIG. 11 and FIG. 13, a stewing operation needs to be performed for approximately 15 minutes during cooking for hash and rice, and accordingly, when the Chinese-style salad is prepared during this stewing time, the whole cooking time becomes shorter. Furthermore, the completion state of bean sprouts contained in the Chinese-style salad is the state 6*f*, and therefore, no problem occurs even when the robot arm 40 in the state 5*w* touches the bean sprouts. Therefore, even when the cooking control unit 30 is in the state 5*w*, the cooking control unit 30 handles the bean sprouts, if needed.

The hygienic state table initializing unit 35 draws up a cooking plan so that the hygienic state of the food 2 makes an appropriate transition in accordance with the state transition table 33 and time, and the amount of water to be used and other requirements are satisfied. This cooking plan is drawn up by performing optimizations in accordance with an objective function by the use of an existing operational research (OR) technique.

Figure 14:
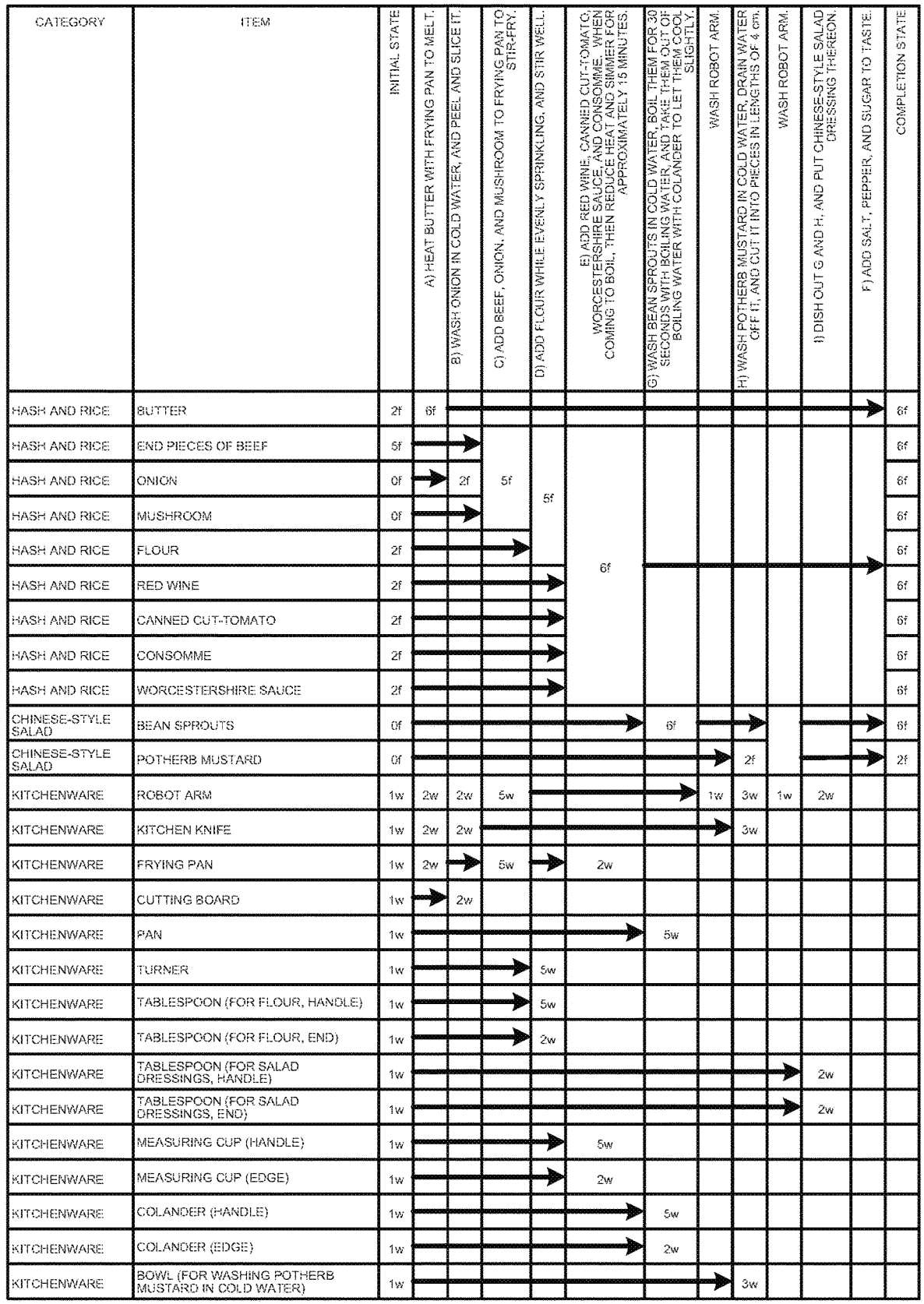
FIG. 14 is a diagram illustrating an example of a hygienic state table for managing a hygienic state that changes with each operation task.

For example, by setting an objective function to time, the shortest-time cooking plan is drawn up. FIG. 14 is a diagram illustrating an example of the hygienic state table 34 for managing a hygienic state that changes with each operation task. In FIG. 14, the objective function is time.

In FIG. 14, the vertical axis indicates the food 2, the robot arm 40, and the kitchenware 4, and the horizontal axis indicates an operation task. In the middle section of the table, hygienic states of the food 2 are illustrated. As cooking proceeds, food ingredients are mixed together, and therefore, when cells of the table are combined, a mixed state of the foods 2 is indicated.

Note that, here, the robot arm 40 shall be configured to measure a seasoning or introduce the seasoning to cooking by the use of a clean cup or spoon, without not directly touching the seasoning, and shall be configured not to change the hygienic state of the seasoning itself. Therefore, the cooking control unit 30 does not manage the hygienic state of the seasoning.

In some kitchenware 4 and some measuring tools, there is a difference in hygienic state between a handle to be held by the robot arm 40 and an end portion to come into contact with a seasoning or food, and therefore, the cooking control unit 30 manages the handle and the end separately. This management makes it possible to prevent the hygienic state of a handle from being spread to food and prevent the hygienic state of an end portion from being spread to the robot arm 40.

The third column from the left in FIG. 14 indicates an initial state at the time of cooking start, in which all of the robot arm 40 and the kitchenware 4 have been already washed and are in a clean state, namely, the state 1*w*. The foods 2 have different states. In FIG. 14, as a cooking process progresses to the right from the third column, a hygienic state changes. When an operation task in the fourth column "A) Heat butter with a frying pan to melt" is performed, the hygienic state transitions from the initial state in the third column to a state in the fourth column.

In this operation task, the robot arm 40 cuts out butter with a kitchen knife. The butter is melted on a frying pan, so that the hygienic state shifts to the "6*f*. Heated state". The robot arm 40 in the thirteenth line and the kitchen knife in the fourteenth line are in the state 1*w* in the third column, and then, when the robot arm 40 and the kitchen knife touch the butter in the state 2*f*, so that the state shifts to the state 2*w* in the fourth column in accordance with FIG. 4 (see the fourth column of the thirteenth line and the fourth column of the fourteenth line). When the frying pan in the fifteenth line touches the molten butter, the state of the frying pan shifts from the state 1*w* to the state 2*w* in accordance with FIG. 4 (see the fourth column of the fifteenth line).

When an operation task in the fifth column "B) Wash an onion in water, peel and slice the onion" is performed, the hygienic state transitions from the state in the fourth column to the state in the fifth column. In this cooking task, washing the onion in water causes the state of the onion to shift from the state 0*f* to the state 2*f* in accordance with FIG. 7. At the time of slicing the onion with the kitchen knife, when the cutting board comes in touch with the onion, the state of the cutting board shifts from the state 1*w* to the state 2*w* in accordance with FIG. 4 (see the fifth column of the sixteenth line).

While referring to the state transition table 33 illustrated in FIG. 4 for the robot arm 40 and the kitchenware 4 and to the state transition tables 33 illustrated in FIG. 6 and FIG. 7 for the food 2, the cooking control unit 30 draws up the hygienic state table 34 illustrated in FIG. 14 to realize appropriate hygiene management. For example, the cooking control unit 30 performs control to execute an operation task in the tenth column "Wash the robot arm" before an operation task in the eleventh column "Wash a potherb mustard in water, drain water off the potherb mustard, and cut the potherb mustard into pieces in lengths of 4 cm", whereby bacteria originated from beef (an operation task C in the sixth column) is prevented from adhering to the potherb mustard that remains unheated and is to be eaten by a user.

In an operation task in the ninth column "G) Wash bean sprouts in water, boil the bean sprouts for 30 seconds with boiling water, and take the bean sprouts out of the boiling water with a colander to let the bean sprouts cool slightly", the bean sprouts are eventually heated, and therefore the robot arm 40 in the state 5*w* indicating the adhesion of bacteria is allowed to treat the bean sprouts. Thus, the cooking control unit 30 can reduce wasteful washing to enhance cooking efficiency.

The cooking control unit 30 does not cook a plurality of recipes in turn, but cooks a plurality of recipes in parallel while taking into consideration costs required for cooking and washing of the robot arm 40 and hygiene, so that the total cooking time can be shortened. For example, the cooking of hash and rice includes an operation task E in the eighth column for 15-minute stewing, and the cooking control unit 30 intensively inserts operation tasks for the Chinese-style salad between the operation task E and the subsequent operation task F in the thirteenth column, so that the total cooking time can be shortened.

Note that, in the case where a plurality of the robot arms 40 cooperate with each other, the hygienic state table 34 illustrated in FIG. 14 is shared. During cooking by the robot arm 40, an additional instruction may be given or an operation interrupt may occur. For example, the cooking control unit 30 can rewrite the hygienic state table 34 illustrated in FIG. 14 in the middle of cooking to change the cooking process in the middle of the cooking.

1.6 Cooking Control Operation

Next, a cooking control operation according to the present embodiment will be described. FIG. 15 is a flowchart that illustrates the flow of the cooking control action according to the present embodiment. As illustrated in FIG. 15, the cooking control unit 30 receives a cooking instruction from a user (step S1), and acquires a recipe (step S2). Then, the cooking control unit 30 reads out the hygienic state DB 31 and the state transition table 33 (step S3).

Then, the cooking control unit 30 draws up the hygienic state table 34, based on the recipe, the hygienic state DB 31, and the state transition table 33 (step S4). The hygienic state table 34 includes: a table for managing hygienic states of the food 2, the kitchenware 4, and the robot arm 40; and a table for managing the hygienic states that change with each operation task. Then, the cooking control unit 30 controls the robot arm 40, based on the hygienic state table 34 (step S5).

1.7 Effects

As described above, according to the present embodiment, the cooking control unit 30 draws up the hygienic state table 34, based on a recipe, the hygienic state DB 31, and the state transition table 33. Then, the cooking control unit 30 controls the robot arm 40, based on the hygienic state table 34, and thus can perform appropriate hygiene management.

In the present embodiment, the cooking control unit 30 allows the robot arm 40 and the kitchenware 4 in the bacteria adhesion state to come into contact with the food 2 that is to be eventually heated, so that washing of the robot arm 40 or the kitchenware 4 can be reduced.

Furthermore, in the present embodiment, the cooking control unit 30 does not allow cooking of a plurality of recipes in turn, but allows cooking of a plurality of recipes in parallel, so that the total cooking time can be shortened.

Note that, in the present embodiment, the control of the cooking robot 1 was described, but, the art of the present disclosure can be similarly applied to the control of actions of a robot and a tool that perform other operations. For example, the present embodiment can be applied to a robot configured to formulate chemicals or a robot configured to prepare medicine.

In the present embodiment, the scheduling of operation tasks required until the completion of cooking was exemplified, but, the present disclosure is not limited to this, and for example, it is possible to configure the scheduling of operation tasks required until, after the completion of cooking, the tableware 3, the kitchenware 4, and the robot arm 40 used for cooking are washed to be in the state 1w. Furthermore, in the present embodiment, it is also possible to include, for example, a sink or a kitchen counter as a target for hygiene management.

The embodiments of the present disclosure were described above, but the technical scope of the present disclosure is not limited to the above-described embodiments, and various modifications may be made without departing from the spirit of the present disclosure. Furthermore, constituent elements in different embodiments and modifications may be suitably used in combination.

Additionally, the effects in the embodiments described in the present specification are merely examples, and are not limited, and other effects may be achieved.

The present art can take the following configurations.

(1) An information processing device, comprising a determination unit configured to determine an execution order of a plurality of tasks including an operation for a target object, based on a transition of a state of an operation tool used in each of the tasks.

(2) The information processing device according to (1), wherein the state of the operation tool is a hygienic state of the operation tool.

(3) The information processing device according to (1) or (2), wherein the determination unit determines the execution order of the tasks, further based on a transition of a state of the target object.

(4) The information processing device according to (3), wherein the state of the target object is a hygienic state of the target object.

(5) The information processing device according to any one of (1) to (4), further comprising:
a state transition storage unit configured to store therein a transition of a state of the operation tool in each of the tasks; and
a task information storage unit configured to store therein information on the tasks, wherein
the determination unit determines the execution order of the tasks, based on
the transition of the state of the operation tool in each of the tasks, the transition of the state being stored in the state transition storage unit, and
the information on the tasks, the information being stored in the task information storage unit.

(6) The information processing device according to (3) or (4), further comprising:
a state transition storage unit configured to store therein a transition of a state of the operation tool in each of the tasks and a transition of a state of the target object in each of the tasks; and
a task information storage unit configured to store therein information on the tasks, wherein
the determination unit determines the execution order of the tasks, based on
the transition of the state of the operation tool in each of the tasks and the transition of the state of the target object in each of the tasks, the transition of the state of the operation tool and the transition of the state of the target object being stored in the state transition storage unit, and
the information on the tasks, the information being stored in the task information storage unit.

(7) The information processing device according to any one of (1) to (6), further comprising:
an initial state storage unit configured to store therein an initial state of the operation tool, wherein
the determination unit manages a transition of the state from the initial state of the operation tool, the initial state being stored in the initial state storage unit.

(8) The information processing device according to any one of (1) to (7), further comprising a control unit configured to control execution of the tasks, based on the execution order determined by the determination unit.

(9) The information processing device according to (8), wherein, when a task is added to the tasks during the control by the control unit,
the determination unit determines again the execution order, including the added task, and
the control unit continues to control the execution, based on the execution order determined again by the determination unit.
(10) The information processing device according to any one of (1) to (10), wherein
the target object is food,
the operation tool is kitchenware and an arm of a robot,
the tasks include: a cooking operation included in a recipe; and washing of the kitchenware and the arm,
the state includes a plurality of stages, and
the transition is caused by contact between at least two of the kitchenware, the arm, and the food.
(11) A scheduling method, comprising determining an execution order of a plurality of tasks including an operation for a target object, based on a transition of a state of an operation tool used in each of the tasks.
(12) A computer program for causing a computer to determine an execution order of a plurality of tasks including an operation for a target object, based on a transition of a state of an operation tool used in each of the tasks.

REFERENCE SIGNS LIST 1 cooking robot
2 food
3 tableware
4 kitchenware
10 controller
11 signal processing circuit
12 CPU
13 DRAM
14 flash ROM
15 PC card interface
16 wireless communication unit
17 internal bus
18 battery
19 CCD camera
20 IMU
21 ToF sensor
22 touch sensor
23 microphone
24 speaker
25 display unit
26 movable unit
27 actuator
28 encoder (potentiometer)
29 memory card
30 cooking control unit
31 hygienic state DB
32 recipe DB
33 state transition table
34 hygienic state table
35 hygienic state table initializing unit
36 state transition control unit
37 control unit
40 robot arm

The invention claimed is:
1. An information processing device, comprising:
a determination unit configured to determine a first execution order of a plurality of tasks including an operation for a target object, based on
a transition of a state of an operation tool used in each of the tasks, wherein the state of the operation tool is a hygienic state of the operation tool; and
a control unit configured to control hygiene state transition based on a determination that a first food item of a plurality of food items is forbidden from coming into contact with a second food item of the plurality of food items.
2. The information processing device according to claim 1, wherein the state of the target object is a hygienic state of the target object.
3. The information processing device according to claim 1, further comprising:
a state transition storage unit configured to store therein a transition of a state of the operation tool in each of the plurality of tasks; and
a task information storage unit configured to store therein information on the plurality of tasks, wherein
the determination unit is further configured to determine the first execution order of the plurality of tasks, based on
the transition of the state of the operation tool in each of the plurality of tasks, the transition of the state being stored in the state transition storage unit, and
the information on the plurality of tasks, the information being stored in the task information storage unit.
4. The information processing device according to claim 1, further comprising:
a state transition storage unit configured to store therein a transition of a state of the operation tool in each of the plurality of tasks and a transition of a state of the target object in each of the plurality of tasks; and
a task information storage unit configured to store therein information on the plurality of tasks, wherein
the determination unit is further configured to determine the first execution order of the plurality of tasks, based on
the transition of the state of the operation tool in each of the plurality of tasks and the transition of the state of the target object in each of the plurality of tasks, the transition of the state of the operation tool and the transition of the state of the target object being stored in the state transition storage unit, and
the information on the plurality of tasks, the information being stored in the task information storage unit.
5. The information processing device according to claim 1, further comprising:
an initial state storage unit configured to store therein an initial state of the operation tool, wherein
the determination unit is further configured to manage a transition of the state from the initial state of the operation tool, the initial state being stored in the initial state storage unit.
6. The information processing device according to claim 1, further comprising a control unit configured to control execution of the plurality of tasks, based on the first execution order determined by the determination unit.
7. The information processing device according to claim 6, wherein,
when a new task is added to the plurality of tasks during the control by the control unit, the determination unit is further configured to determine a second execution order, the second execution order includes the new task along with the plurality of tasks, and the control unit is further configured to control the execution, based on the second execution order determined by the determination unit.

8. The information processing device according to claim 1, wherein the target object is food, the operation tool is kitchenware and an arm of a robot, the plurality of tasks includes: a cooking operation included in a recipe; and washing of the kitchenware and the arm, the state includes a plurality of stages, and the transition is caused by contact between at least two of the kitchenware, the arm, and the food.

9. A scheduling method, comprising:

determining an execution order of a plurality of tasks including an operation for a target object, based on a transition of a state of an operation tool used in each of the tasks, wherein the state of the operation tool is a hygienic state of the operation tool; and controlling hygiene state transition based on a determination that a first food item of a plurality of food items is forbidden from coming into contact with a second food item of the plurality of food items.

10. A non-transitory computer-readable medium having stored thereon, computer-executable instructions which, when executed by a computer, cause the computer to execute operations, the operations comprising:

determining an execution order of a plurality of tasks including an operation for a target object, based on a transition of a state of an operation tool used in each of the tasks, wherein the state of the operation tool is a hygienic state of the operation tool; and controlling hygiene state transition based on a determination that a first food item of a plurality of food items is forbidden from coming into contact with a second food item of the plurality of food items.

* * * * *